US007020879B1

(12) United States Patent
Nemirovsky et al.

(10) Patent No.: US 7,020,879 B1
(45) Date of Patent: Mar. 28, 2006

(54) INTERRUPT AND EXCEPTION HANDLING FOR MULTI-STREAMING DIGITAL PROCESSORS

(75) Inventors: Mario D. Nemirovsky, Saratoga, CA (US); Adolfo M. Nemirovsky, San Jose, CA (US); Narendra Sankar, Santa Clara, CA (US)

(73) Assignee: MIPS Technologies, Inc., Mountain View, CA (US)

( * ) Notice: Subject to any disclaimer, the term of this patent is extended or adjusted under 35 U.S.C. 154(b) by 0 days.

(21) Appl. No.: 09/312,302

(22) Filed: May 14, 1999

Related U.S. Application Data

(63) Continuation-in-part of application No. 09/216,017, filed on Dec. 16, 1998, now Pat. No. 6,477,562, application No. 09/240,012, filed on Jan. 27, 1999, now Pat. No. 6,292,888, and application No. 09/273, 810, Mar. 22, 1999, now Pat. No. 6,389,449.

(51) Int. Cl.
*G06F 9/46* (2006.01)
*G06F 15/76* (2006.01)

(52) U.S. Cl. ........................ 718/107; 712/23
(58) Field of Classification Search ........... 712/213, 712/23, 228, 214; 709/107, 108; 718/106, 718/107, 108
See application file for complete search history.

(56) References Cited

U.S. PATENT DOCUMENTS

| | | | |
|---|---|---|---|
| 4,197,579 A | 4/1980 | Forsman et al. | |
| 4,200,927 A | 4/1980 | Hughes et al. | |
| 5,309,173 A | 5/1994 | Izzi et al. | |
| 5,361,337 A | 11/1994 | Okin | |
| 5,461,722 A | 10/1995 | Goto | |
| 5,511,210 A | 4/1996 | Nishikawa et al. | |

(Continued)

FOREIGN PATENT DOCUMENTS

EP    0806730 A2    11/1997

(Continued)

OTHER PUBLICATIONS

Nenirovsky, (Disc Dynamic Instructor p. 1-183 Stream Computer, 1990.*

(Continued)

*Primary Examiner*—Larry D. Donaghue
(74) *Attorney, Agent, or Firm*—James W. Huffman; Donald Boys

(57) ABSTRACT

A multi-streaming processor has a plurality of streams for streaming one or more instruction threads, a set of functional resources for processing instructions from streams, and interrupt handler logic. The logic detects and maps interrupts and exceptions to one or more specific streams. In some embodiments one interrupt or exception may be mapped to two or more streams, and in others two or more interrupts or exceptions may be mapped to one stream. Mapping may be static and determined at processor design, programmable, with data stored and amendable, or conditional and dynamic, the interrupt logic executing an algorithm sensitive to variables to determine the mapping. Interrupts may be external interrupts generated by devices external to the processor software (internal) interrupts generated by active streams, or conditional, based on variables. After interrupts are acknowledged streams to which interrupts or exceptions are mapped are vectored to appropriate service routines. In a synchronous method no vectoring occurs until all streams to which an interrupt is mapped acknowledge the interrupt.

23 Claims, 7 Drawing Sheets

U.S. PATENT DOCUMENTS

| | | | |
|---|---|---|---|
| 5,535,365 | A | 7/1996 | Barriuso et al. |
| 5,542,088 | A | 7/1996 | Jennings, Jr. et al. |
| 5,546,593 | A | 8/1996 | Kimura et al. |
| 5,561,776 | A | 10/1996 | Popescu et al. |
| 5,600,837 | A | 2/1997 | Artieri |
| 5,649,144 | A | 7/1997 | Gostin et al. |
| 5,694,572 | A | 12/1997 | Ryan |
| 5,701,432 | A | 12/1997 | Wong et al. |
| 5,713,038 | A | 1/1998 | Motomura |
| 5,745,778 | A | 4/1998 | Alfieri |
| 5,748,468 | A | 5/1998 | Notenboom et al. |
| 5,758,142 | A | 5/1998 | McFarling et al. |
| 5,784,613 | A | 7/1998 | Tamirisa |
| 5,812,811 | A | 9/1998 | Dubey et al. |
| 5,815,733 | A | 9/1998 | Anderson et al. |
| 5,852,726 | A | 12/1998 | Lin et al. |
| 5,860,017 | A | 1/1999 | Sharangpani et al. |
| 5,867,725 | A | 2/1999 | Fung et al. |
| 5,913,049 | A | 6/1999 | Shiell et al. |
| 5,933,627 | A | 8/1999 | Parady |
| 5,946,711 | A | 8/1999 | Donnelly |
| 5,987,492 | A | 11/1999 | Yue |
| 6,016,542 | A | 1/2000 | Gottlieb et al. |
| 6,018,759 | A | 1/2000 | Doing et al. |
| 6,029,228 | A | 2/2000 | Cai et al. |
| 6,052,708 | A | 4/2000 | Flynn et al. |
| 6,061,710 | A | 5/2000 | Eickemeyer et al. |
| 6,076,157 | A | 6/2000 | Borkenhagen et al. |
| 6,105,127 | A | 8/2000 | Kimura et al. |
| 6,115,802 | A | 9/2000 | Tock et al. |
| 6,119,203 | A | 9/2000 | Snyder et al. |
| 6,192,384 | B1 | 2/2001 | Dally et al. |
| 6,212,544 | B1 | 4/2001 | Borkenhagen et al. |
| 6,260,077 | B1 | 7/2001 | Rangarajan et al. |
| 6,308,261 | B1 | 10/2001 | Morris et al. |
| 6,356,996 | B1 | 3/2002 | Adams |
| 6,430,593 | B1 | 8/2002 | Lindsley |
| 6,442,675 | B1 | 8/2002 | Derrick et al. |
| 6,487,571 | B1 | 11/2002 | Voldman |
| 6,493,749 | B1 | 12/2002 | Paxhia et al. |
| 6,535,905 | B1 | 3/2003 | Kalafatis et al. |
| 2002/0062435 | A1 | 5/2002 | Nemirovsky et al. |
| 2003/0084269 | A1 | 5/2003 | Drysdale et al. |

FOREIGN PATENT DOCUMENTS

| | | |
|---|---|---|
| EP | 0827071 A2 | 3/1998 |
| JP | 2103630 | 10/1988 |
| JP | 63254530 | 10/1988 |
| JP | 4335431 | 11/1992 |
| JP | 546379 | 2/1993 |
| JP | 09506752 A2 | 6/1997 |
| JP | 1011301 A2 | 1/1998 |
| JP | 10124316 A2 | 5/1998 |
| JP | 10207717 A2 | 8/1998 |
| WO | WO9427216 A1 | 11/1994 |
| WO | WO0023891 A1 | 4/2000 |

OTHER PUBLICATIONS

Nemirovsky et al., Disc: Dynamic Instruction Stream Computer, ACM, 1991, pp 163-171.

Yamamoto et al., Performance Estimation of Multistreamed, Superscalar Processors, IEEE, 1994, pp 195-204, Hawaii, US.

U.S. Appl. No. 09/592,106, filed Jun. 12, 2000, Melvin et al.
U.S. Appl. No. 09/595,776, filed Jun. 16, 2000, Musoll et al.
U.S. Appl. No. 09/616,385, filed Jul. 14, 2000, Musoll et al.
U.S. Appl. No. 09/629,805, filed Jul. 31, 2000, Nemirovsky et al.
U.S. Appl. No. 09/312,302, filed May 15, 1999, Nemirovsky et al.
U.S. Appl. No. 09/273,810, filed Mar. 22, 1999, Nemirovsky et al.
U.S. Appl. No. 09/240,012, filed Jan. 27, 1999, Nemirovsky et al.

Diefendorff, Keith, "Compaq Chooses SMT for Alpha," Dec. 6, 1999, Microprocessor Report.

Diefendorff, Keith, "WinChip 4 Thumbs Nose At ILP," Microprocessor Report, Dec. 7, 1998, vol. 12, No. 16.

Diefendorff, Keith, "Jalapeño Powers Cyrix's M3," Microprocessor Report, Nov. 16, 1998, vol. 12, No. 15.

Slater, Michael, "Rise Joins x86 Fray with mP6," Microprocessor Report, Nov. 16, 1998, vol. 12, No. 15.

Eggers et al., "Simultaneous Multithreading: A Platform for Next-Generation Precessors," IEEE Micro, Sep./Oct. 1997.

Thekkath et al. The Effectiveness of Multiple Hardware Contexts. In Proceedings of the 6th International Conference on Architectural Support for Programming Languagesand Operating Systems, pp. 328-337, San Jose, CA, Oct. 1994. ACM.

Becker et al., "The PowerPC 601 Microprocessor," IEEE Micro, Oct. 1993.

Cui et al., Parallel Replacement Mechanism for MultiThread, Advances in Parallel and Distributed Computing, 1997. Proceedings, IEEE, Mar. 21, 1977, pp. 338-344.

McFarling, Scott. Combining Branch Predictors. WRL Technical Note TN-36. Jun. 1993. pp. 11-12. Digital Western Research Laboratory. Palo Alto, CA, US.

Ungerer et al. A Survey of Processors with Explicit Multithreading. ACM Computing Surveys, vol., 35, No. 1. Mar. 2003. pp. 29-63.

Fiske et al., "Thread Prioritization: A Thread Scheduling Mechanism for Multiple-Context Parallel Processors", 1995, pp 210-221, IEEE.

Yamamoto, Wayne, "An Analysis of Multistreamed, Superscalar Processor Architectures", University of California Santa Barbara dissertation, Dec. 1995, Santa Barbara, US.

Steere et al., "A Feedback—Driven Proportion Allocator for Real-Rate Scheduling", Third Symposium on Operating Systems Design and Implementation, Feb. 1999, pp 145-158, USENIX Association.

Yamamoto et al., "Increasing Superscalar Performance Through Multistreaming", 1995.

Tullsen et al., "Simultaneous Multithreading: Maximizing on-Chip Parallelism", 22nd Annual International Symposium on Computer Architecture, Jun. 1995, Santa Margherita Ligure, Italy.

Yoaz et al., "Speculation Techniques for Improving Load Related Instruction Scheduling", 1999, pp 42-53, IEEE.

Kessler, R.E., "The Alpha 21264 Microprocessor: Out-of-Order Execution at 600 Mhz", Aug. 1998.

Tullsen et al., "Supporting Fine-Grained Synchronization on a Simultaneous Multithreading Processor", 5th Annual International Symposium on Computer Architecture, Jan. 1999.

Nemirovsky et al., "Quantitative Study of Data Caches on a Multistreamed Architecture", Workshop on Mutlithreaded Execution Architecture and Compilation, Jan. 1998.

Li et al., "Design and Implementation of a Multiple-Instruction-Stream Multiple-Execution-Pipeline Architecture", 7th International Conference on Parallel and Distributed Computing and Systems, Oct. 1995, Washington D.C.

Donalson et al., "DISC: Dynamic Intruction Stream Computer, An Evaluation of Performance", 26th Hawaii Conference on Systems Sciences, 1993, pp 448-456, vol. 1.

The PowerPC Architecture: A Specification for a New Family of RISC Processors, Second Edition, May 1994, pp 70-72, Morgan Kaufmann, San Francisco.

MC68020 32-Bit Microprocessor User's Manual, Third Edition, 1989, pp 3-125, 3-126, and 3-127, Prentice Hall, New Jersey.

Potel, M.J., Real-Time Playback in Animation Systems, Proceedings of the 4th Annual Conference on Computer Graphics and Interactive Techniques, 1977, pp. 72-77, San Jose, CA.

ARM Architecture Reference Manual, 1996, pp. 3-41, 3-42, 3-43, 3-67, 3-68, Prentice Hall.

ESA/390 Principles of Operation, IBM Library Server, 1993, Table of Contents and Para. 7.5.31 and 7.5.70 (available at : http://publibz.boulder.ibm.com/cgi-bin/bookmgr_OS390/BOOK/DZ9AR001/CCONTENTS).

MC88110 Second Generation RISC Microprocessor User's Manual, 1991, pp. 10-66, 10-67 and 10-71, Motorola, Inc.

Diefendorff, Keith et al., Organization of the Motorola 88110 Superscalar RISC Microprocessor, IEEE Micro, Apr. 1992, pp. 40-63, vol. 12, No. 2.

Kane, Gerry, PA-RISC 2.0 Architecture, 1996, pp 7-106 and 7-107, Prentice Hall, New Jersey.

Diefendorff, Keith et al., AltiVec Extension to PowerPC Accelerates Media Processing, Mar.-Apr. 2000, pp. 85-95, IEEE Micro, vol. 20, No. 2.

Pai, Vijay et al., An Evaluation of Memory Consistancy Models for Shared-Memory Systems with ILP Processors, Proceedings of ASPLOS-VII, Oct. 1996, pp. 12-23, ACM. Inc., Grunewald, Winfried et al., Towards Extremely Fast Context Switching in a Block-Multithreaded Processor, Proceedings of EUROMICRO-22, 1996, pp. 592-599.

Bradford, Jeffrey et al., Efficient Synchronization for Multithreaded Processors, Workshop on Multithreaded Execution, Architecture and Compilation, Jan.-Feb. 1998, pp. 1-4.

Tullsen, Dean et al., Supporting Fine-Grained Synchronization on a Simultaneous Multithreading Processor, UCSD CSE Technical Report CS98-587, Jun. 1998, all pages, US.

* cited by examiner

|  | Supervisory | Enable | Disable | Priorities | Interrupts |
|---|---|---|---|---|---|
| Stream 1 | ● |  | ● |  |  |
| Stream 2 | ● |  |  |  | ● |
| Stream 3 |  |  | ● |  |  |

Control Authorization for Stream 0

*Fig. 1B*

| Integer 1 | Integer 2 | Integer 3 | Integer 4 | Float Pt. 1 | Float Pt. 2 | Float Pt. 3 | Float Pt. 4 | Branch Unit 1 | Branch Unit 3 | Branch Unit 2 | Branch Unit 4 |
|---|---|---|---|---|---|---|---|---|---|---|---|
| ● | ● | ● |  |  |  |  |  | ● |  |  |  |

Hard Resource Assignment for Stream 0

*Fig. 1C*

Priorities for Stream 0

Control Indicators for Stream 0

INTERRUPT AND EXCEPTION HANDLING FOR MULTI-STREAMING DIGITAL PROCESSORS

CROSS-REFERENCE TO RELATED DOCUMENTS

The present application is a continuation-in-part (CIP) of patent application Ser. No. 09/216,017, filed Dec. 16, 1998 now U.S. Pat. No. 6,477,562, Ser. No. 09/240,012, filed Jan. 27, 1999 now U.S. Pat. No. 6,292,888, and Ser. No. 09/273,810, filed Mar. 22, 1999 now U.S. Pat. No. 6,389,449, all three of which are incorporated herein in their entirety by reference.

FIELD OF THE INVENTION

The present invention is in the field of digital processors, and pertains more particularly to such devices capable of executing multiple processing streams concurrently, which are termed multi-streaming processors in the art.

BACKGROUND OF THE INVENTION

Multi-streaming processors capable of processing multiple threads are known in the art, and have been the subject of considerable research and development. The present invention takes notice of the prior work in this field, and builds upon that work, bringing new and non-obvious improvements in apparatus and methods to the art. The inventors have provided with this patent application an Information Disclosure Statement listing a number of published papers in the technical field of multi-streaming processors, which together provide additional background and context for the several aspects of the present invention disclosed herein.

For purposes of definition, this specification regards a stream in reference to a processing system as a hardware capability of the processor for supporting and processing an instruction thread. A thread is the actual software running within a stream. For example, a multi-streaming processor implemented as a CPU for operating a desktop computer may simultaneously process threads from two or more applications, such as a word processing program and an object-oriented drawing program. As another example, a multi-streaming-capable processor may operate a machine without regular human direction, such as a router in a packet switched network. In a router, for example, there may be one or more threads for processing and forwarding data packets on the network, another for quality-of-service (QoS) negotiation with other routers and servers connected to the network and another for maintaining routing tables and the like. The maximum capability of any multi-streaming processor to process multiple concurrent threads remains fixed at the number of hardware streams the processor supports. A multi-streaming processor operating a single thread runs as a single-stream processor with unused streams idle. For purposes of the present specification a stream is considered an active stream at all times the stream supports a thread, and otherwise inactive.

As described above and in the papers provided by IDS in the present case, superscalar processors are also known in the art. This term refers to processors that have multiples of one or more types of functional units, and an ability to issue concurrent instructions to multiple functional units. Most central processing units (CPUs) built today have more than a single functional unit of each type, and are thus superscalar processors by this definition. Some have many such units, including, for example, multiple floating point units, integer units, logic units, load/store units and so forth. Multi-streaming superscalar processors are known in the art as well.

The inventors have determined that there is a neglected field in the architecture for all types of multi-streaming processors, including, but not limited to the types described above: The neglected field is that of communications between concurrent streams and types of control that one active stream may assert on another stream, whether active or not, so that the activity of multiple concurrent threads may be coordinated, and so that activities such as access to functional units may be dynamically shared to meet diverse needs in processing. A particular area of neglect is in mapping and handling of external and internal interrupts in the presence of multiple streams and also exception handling.

Accordingly, what is clearly needed in the art is apparatus and methods for more sophisticated interstream control and communication in all processor architectures that support multi-streaming or multi-threading, including but not limited to superscalar processors and processors that interleave instructions, particularly for mapping and handling of all types of interrupts and exceptions. The present invention teaches such apparatus and methods, which are disclosed below in enabling detail. Significant added flexibility, efficiency, and robustness are provided to multistream processor architectures and the ability to handle time-critical threads is enhanced at relatively low cost in the number of additional gates for implementation, as well as considerable additional benefits.

SUMMARY OF THE INVENTION

In a preferred embodiment of the present invention a multi-streaming processor system is provided, comprising a plurality of streams for executing one or more instruction threads; a set of functional resources for processing instructions from streams; and interrupt logic. Through the interrupt logic interrupts or exceptions are detected and mapped to one or more specific streams. One interrupt or exception may be mapped to two or more streams, or two or more interrupts or exceptions may be mapped to one stream.

In some embodiments mapping of interrupts to streams is static and determined at processor design. In other embodiments mapping of interrupts and exceptions is programmable, and in some cases uses a storage file or table wherein the interrupt logic refers to the data store for mapping data to relate received interrupts or exceptions to streams. In other embodiments mapping is conditional and dynamic, the interrupt logic executing an algorithm being sensitive to variables to determine the mapping. In some other embodiments, it may be a combination of any of the above.

Interrupts may be external interrupts generated by sources external to the processor or, software interrupts generated by active streams. In some embodiments there is a mask for enabling/disabling recognition of mapped interrupts or exceptions.

In preferred embodiments, after mapping is determined for a detected interrupt or exception the one or more streams are interrupted by the interrupt logic. Further, after every interrupted stream acknowledges the interrupt, it is vectored to a service routine by the interrupt logic. In some embodiments two or more streams are interrupted by one interrupt or exception, and the interrupt logic delays vectoring any stream to a service routine until all interrupted streams acknowledge the interrupt. In some embodiments two streams acknowledging the same interrupt are vectored to different service routines by the interrupt logic.

In another aspect of the invention a method for processing interrupts in a multi-stream processor is provided comprising steps of (a) detecting an interrupt or exception and passing the detected interrupt or exception to interrupt logic; and (b) mapping the interrupt or exception to one or more streams of the multi-stream processor. In step (b) in some embodiments the interrupt or exception may be mapped to two or more streams. In other embodiments, in step (a), two or more interrupts or exceptions are detected, and in step (b), the two or more interrupts or exceptions are mapped to one stream.

This mapping of interrupts to streams may be static and determined at processor design, programmable, as referring to a map in data storage, or conditional and dynamic, the interrupt logic executing an algorithm sensitive to variables to determine the mapping. The interrupts may be external interrupts generated by sources external to the processor or the software interrupts generated by active streams.

In preferred embodiments, after mapping is determined for a detected interrupt or exception, the one or more streams are interrupted by the interrupt logic. After acknowledgement the interrupted stream or streams are vectored to a service routine. In some cases, two or more streams are interrupted by one interrupt or exception, and the interrupt logic delays vectoring any stream to a service routine until all interrupted streams acknowledge the interrupt. Two streams acknowledging the same interrupt may be vectored to different service routines by the interrupt logic.

In further embodiments of the invention computing systems are provided having multi-stream processors having a plurality of streams for executing one or more instruction threads; and interrupt handling logic, the systems characterized in that through the interrupt logic specific interrupts or exceptions are detected and mapped to one or more specific streams. Again one interrupt or exception may be mapped to two or more streams, two or more interrupts or exceptions may be mapped to one stream. The mapping may be static, programmable or conditional and dynamic, the interrupt logic executing an algorithm sensitive to variables to determine the mapping.

In various embodiments of the present invention, described in enabling detail below, for the first time a system and method is provided for handling interrupts and exceptions for a multi-stream device in a flexible and orderly manner.

BRIEF DESCRIPTION OF THE DRAWINGS

FIG. 1B is an exemplary bitmap illustrating control authorization data according to an embodiment of the present invention FIG. 1C illustrates resource assignment for streams according to an embodiment of the present invention.

DESCRIPTION OF THE PREFERRED EMBODIMENTS

Figure 1A:
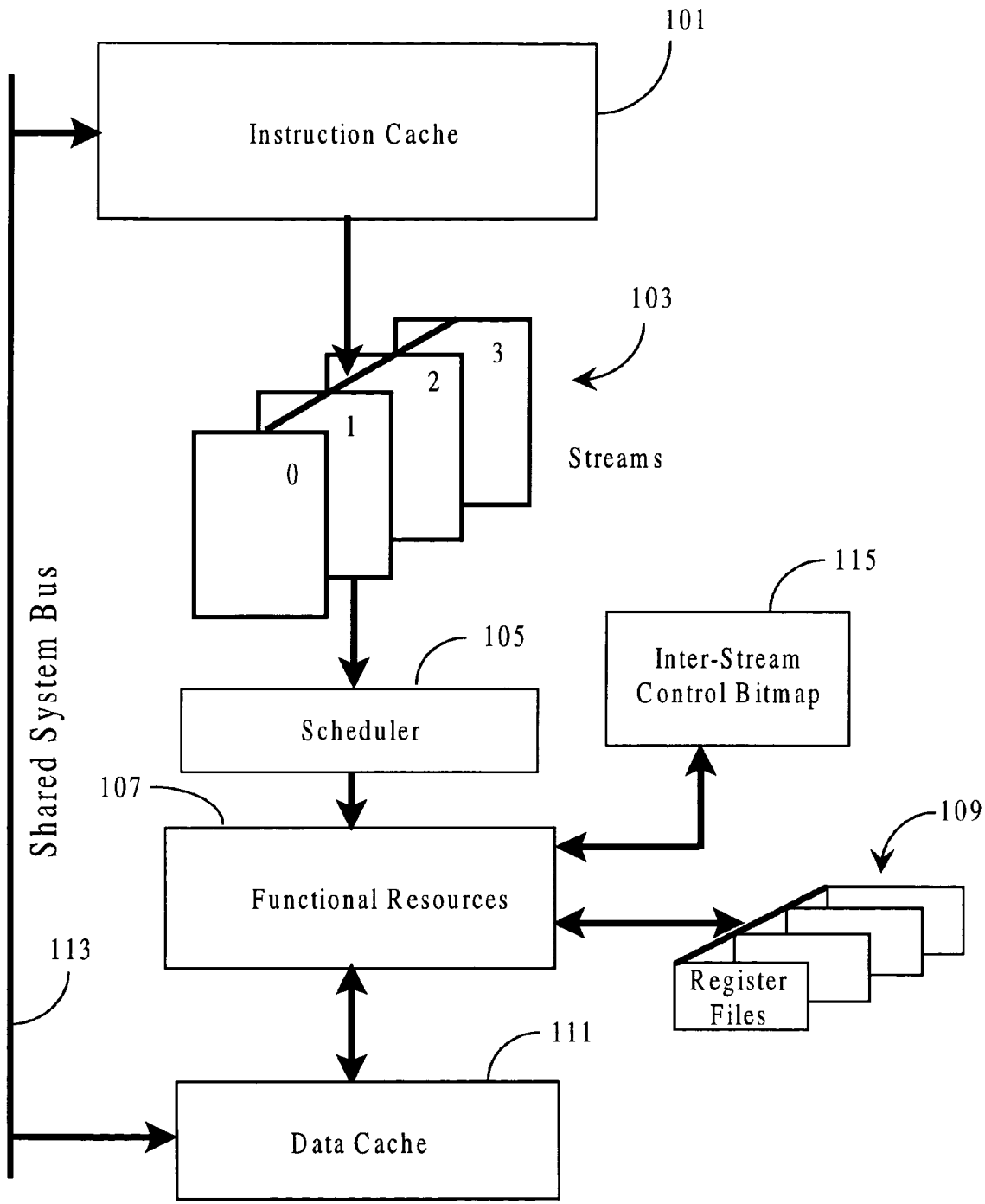
FIG. 1A is a generalized diagram of a multi-streaming processor according to an embodiment of the present invention.

Multiple active streams operating in the same processor are often related by the nature of the threads supported. Advantages may be gained, therefore, if a thread running in one stream (an active stream) is enabled to initiate and/or control functions of one or more other active streams. Active streams may share work on the same task and may therefore need efficient methods of passing data. One active stream may temporarily require exclusive use of certain processing resources or of total throughput. Such an active stream needs a way of asserting its particular claims, while allowing other active streams to continue operating as efficiently as possible with fewer resources. These are issues in all multi-streaming processors. In this concept and the descriptions that follow, it is well to remember again that by an active stream is a stream that is running a particular thread, and also that a thread context is associated with an active stream by a register file.

Multi-streaming processors, as described in priority document Ser. No. 09/216,017, now U.S. Pat. No. 6,477,562 have physical stream resources for concurrently executing two or more instruction threads, and multiple register files as well. The present invention applies to all such processors and also to processors that may accomplish multi-streaming in other ways. In various embodiments of the present invention a set of editable characteristics is kept for active streams, and these characteristics regulate the forms of control that may be exercised by other active streams over that particular stream. These editable characteristics may take any one of several forms in different embodiments, by convenience or for special reasons. In preferred embodiments the editable characteristics are implemented in silicon on the processor chip, as this arrangement allows very quick access in operation. The invention, however, is not thus limited, and such characteristics may be stored and editable in other ways. The editable characteristics may also be mapped as stream-specific or context-specific in different situations and embodiments.

In one exemplary embodiment a bit-map is maintained wherein individual bits or binary values of bit combinations are associated with individual streams and assigned particular meaning relative to inter-stream communication and control, indicating such things as supervisory hierarchy among streams at any particular time, access of each stream to processor resources, and state control for Master Stream, Enable and Disable modes, and Sleep modes, which are described in further detail below.

In the bit-map described above, some supervisory control bits regulate the forms of control that any other active stream may exercise over each individual active stream. Active streams may, within carefully defined limits, set and reset their own control bits, and other active streams with appropriate permission may also do so. A master thread, at any point in time, may run in a stream, which is then designated a Master Stream while running a Master Thread, and a Master Stream has complete control over slave streams, and may at any time override the control bits of the slave streams. If there is more than one Master stream running, each may have different designated slave streams. With appropriate control settings, active streams may act as supervisors of other active streams, temporarily (typically) controlling their execution and communicating with them. Further, a Master Stream has, and supervisor streams may have, control over what processing resources active slave streams may use, either directly or by modifying a stream's priorities.

FIG. 1A is a generalized diagram of a multi-streaming processor according to an embodiment of the present invention, showing an instruction cache 101 providing instructions from multiple threads to four streams 103, labeled 0–3, from which an instruction scheduler dispatches instructions from active streams to functional resources 107. A set of multiple register files 109, in this case four, but may be more, is shown for use in processing, such as for storing thread contexts to be associated with active streams during processing. Data flows to and from register files and a data cache 111, and the functional resources may include a Register Transfer Unit (RTU) as taught in priority document Ser. No. 09/240,012, now U.S. Pat. No. 6,292,888, incorporated herein by reference.

In this embodiment a unique inter-stream control bit-map 115 stores individual bits, and in some cases binary values of bit combinations, associated with individual streams and assigned particular meaning relative to inter-stream communication and control, as introduced above. A shared system bus 113 connects the instruction and data caches. The diagram shown is exemplary and general, and the skilled artisan will recognize there are a number of variations which may be made. The importance for the present purpose is in the multiplicity of streams adapted to support a multiplicity of threads simultaneously.

It was described above that Inter-stream control bitmap 115 is a reference repository of control settings defining and configuring Inter-stream control. In this reference single bits in some instances, and binary values represented by two or more bits in other instances, define such things as priorities of an active stream for shared system resources, fixed resource assignment to particular streams, and control hierarchy among active streams. Specific control characteristics in one exemplary embodiment are described below.

In one aspect of control in this embodiment of the present invention, an active stream is enabled to set and edit control reference data unique to that stream. In another aspect one stream may alter the control reference data for other streams. In the latter aspect each particular stream may control which other streams may edit which control data for the particular stream.

FIG. 1B is a portion of bit map 115 of FIG. 1A, showing bits set to indicate state of authorization granted by one stream, in this case stream 0, for other streams to alter control bits associated uniquely with stream 0, or to exercise specific control functions relative to stream 0. A similar bit map in this embodiment exists for each of streams 1, 2, and 3, but one instance is sufficient for this description. In this matrix there is a row for each of streams 1, 2, and 3, and columns for control definition. Again, these bits may be set by active stream 0, and the motivation for editing the bit map will be related to the function of stream 0, which will be defined by the nature of the thread running in stream 0. The bit map, however, is a physical resource associated with a stream in a multi-streaming processor, and exists to enable several forms and degrees of inter-stream control and cooperation.

The first column from the left in FIG. 1B is labeled supervisory, and indicates supervisory authorization. Logical 1 in the row for streams 1 and 2 indicates that stream 0 grants supervisory access to streams 1 and 2, but not to stream 3. Supervisory access means that these other streams may edit the control data for the instant stream. With the setting shown, then, the inter-stream control data for stream 0 may be edited by streams 0 (itself) and also by streams 1 and 2, but not by stream 3. Because each active stream may edit its own control data, the authorization for streams 1 and 2 may be rescinded at any time, and re-authorized at any time, by active stream 0.

An example of a situation wherein stream 0 might grant access to one or more streams to edit its own control data configuration would be in the case that stream 0 is running a very low priority thread, or is not running a thread at all, and is simply available for a new thread.

The second column in FIG. 1B is labeled enable. Stream 0 uses a bit in this column to grant permission for another stream to enable stream 0 if stream 0 is disabled. In the instant case there are no logical 1's in this column, so none of streams 1, 2 or 3 may enable stream 0. There is a distinct difference between the authorization for supervisory editing access described above relative to the first column of FIG. 1B, and authorization for such as enable or disable. In the first case, permission is granted for another stream to set the control data for the instant stream, reconfiguring the control hierarchy between streams in a broad aspect. In the second instance no access to control data is granted to another stream, but another stream is granted permission to exercise a specific form of control, such as enable or disable for the instant stream. The next bit column to the right of enable is disable, and the exemplary setting indicates that streams 1 and 3 are at the moment granted permission to disable stream 0.

The next bit column is labeled priorities, and a logical 1 in this column for a stream indicates that stream 0 grants another stream permission to set priorities for stream 0. In the instant case stream 0 does not allow any other stream to set its priorities. Priorities are typically set in embodiments of the invention to indicate access to processor resources. The next bit column is labeled interrupts, and means that another stream may interrupt stream 0. In the instant case stream 2 is granted the interrupt privilege.

It should be clear to the skilled artisan, given the teachings of this specification, that there are a variety of revisions that might be made in the matrix shown, and the meaning of specific columns. It should also be clear that the matrix illustration is exemplary, and the bits described could as well be individual bits in a two-byte register, as long as the convention is kept as to which bits relate to which streams and to which control functions and resources.

In preferred embodiments of the present invention inter-stream control is described for multi-streaming, super-scalar processors, meaning processors that have multiple streams and also multiple functional resources. Such a processor may have, for example, several integer processing units, several floating point processing units, several branch units, and so on. The inter-stream control configuration indicated by bitmap 115 (FIG. 1A) may be set in embodiments of the invention to reserve certain resources to certain streams, and restrict those same resources from use by other streams.

FIG. 1C is a bit row indicating instant resource assignment for stream 0. Again, similar resource assignment configuration may exist for all other streams as well, but one should be sufficient for illustration. In this case there are 4 integer units, 4 floating point units, and 4 branch units. The instant setting shows that stream 0 has reserved access to integer units 1, 2, and 3, and to branch unit 1. Conversely, this setting means stream 0 may not access integer 4, any floating point unit, or branch units 1, 2, or 3. Because stream 0 as an active stream may set its own configuration, including granting and denying control bit setting to other streams, stream 0 (or any active stream) may reserve, in specific instances, specific resources. Again it will apparent to the skilled artisan that the structure illustrated is exemplary, and the could be varied in a number of ways.

In some cases, rather than relying on a fixed assignment and division of resources in a superscalar processor, better results may be obtained by assigning resources by priority to streams, or by a mixture of assignment for some resources and priority management for others. By fixed assignment is simply meant that for a period of time, as shown in FIG. 1C, resources may be distributed exclusively, but the distribution may, of course, be edited (altered) by each active stream at any time for its own assignments, or, in cases where authorization is granted, by another active stream.

Figures 1D, 1E:
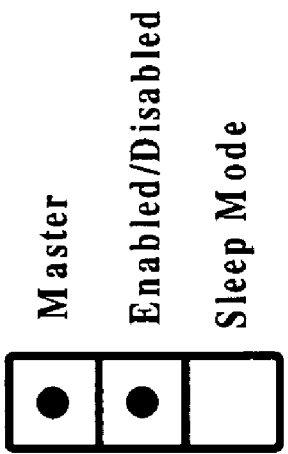
FIG. 1D illustrates priorities for a stream according to an embodiment of the present invention.
FIG. 1E illustrates control indicators for one stream according to an embodiment of the present invention.

FIG. 1D illustrates a portion of bitmap 115 of FIG. 1A devoted to priority settings for stream 0. In this case, priorities may vary from zero to seven, so three bits are needed for each priority level setting, with the binary value of the bits indicating priority level. There are in one embodiment three different sorts of priorities, which may be termed execution priority, interrupt priority and resource priority. All three types of priority are illustrated in some form in FIG. 1D, although there may be more or less granularity than illustrated.

In FIG. 1D the top row indicates execution priority. This setting determines for a stream what threads may execute in that stream. That is, a thread may have inherently a certain priority or be assigned a priority, and the execution priority as shown in FIG. 1D may be edited by a stream or for a stream by a supervisor active stream. Only a thread with a priority higher than the stream's execution priority may execute in that stream. The concept of a thread having a priority may be implemented in different ways. In some preferred embodiments a thread has a priority by virtue of a thread context which has an assigned and alterable priority. That is, when a context is loaded to a register file, that context may be assigned a priority number of pre-designed or determined granularity, and the thread that is (or will be) called to a stream when the context is made active and associated with a stream may then be said to have the priority of the context stored in the register file. In some cases, as will be made more clear in description to follow, contexts may be stored in memory other than in a register file, and be retrieved at a later time to a register file for initial or further processing. The stored context may carry the priority level of the context as well.

The second row from the top in FIG. 1D indicates interrupt priority for stream 0. The interrupt priority shown is three, which means that only an interrupt with a priority level of three or higher may interrupt stream 0. Again, the stream itself when active with a thread or an active supervisor stream may edit the interrupt priority level.

The lower three rows of the priority level settings for stream 0 in FIG. 1D, labeled integer, floating point, and branch, indicate priority levels for stream 0 for access to types of processor resources. It will be apparent to the skilled artisan that these three do not constitute all types of processor resources, and there may therefore be more rows for the resource priorities in some embodiments.

At the point in time illustrated stream 0 has a seven (highest) priority for integer units, a priority level of four for floating point units, and a priority level of three for branch units. These settings are exemplary, and there may well be, in alternative embodiments, priorities maintained for other processor resources. In various embodiments of the invention temporarily fixed resource assignments may be used exclusively, in others priority may be used exclusively, and in still others, a mixture of the two. Resource priority means that in a case of contention for a resource, the active stream with the highest priority will claim the resource.

In this embodiment of the invention other control bits are used to indicate control hierarchy and state. FIG. 1E indicates such control bits for stream 0. In this example, the control bits for stream 0 in FIG. 1E indicate that stream 0 is, at the instant in time, running a Master thread, and is enabled, but is not in sleep mode. These bits are indicative, and are primarily for reference for other active streams in operation. For example, if one active stream disables another, in the process the acting stream sets the enable/disable bit for the subservient stream. If an active stream puts itself in sleep mode, it sets its sleep bit before going to the sleep mode, so active streams may know, by checking the control bits, that that stream is in sleep mode. The control that one active stream may exert on another is accomplished in some instances by setting bits in the control configuration, such as by editing the resource allocation and/or priorities for another stream, and in other instances in other ways, such as through issuing a software interrupt, starting a new thread in an inactive stream, and so on.

A Master stream is a Master stream by virtue of running a Master thread, and an active Master stream has complete access and control over other streams, which are slave streams to the Master. It is not necessary that any stream grant the Master stream permission to edit control configuration. A Master stream may have a variety of duties, one of which, in preferred embodiments, is initial setup of a multi-streaming processor. On startup and reset in a system utilizing a processor according to an embodiment of this invention, a Master stream will typically be called at some point in the boot process, and will act for example to set initial priorities for streams, to set supervisory bits, and to start specific threads in specific streams. These duties can and will vary from system to system, as, in some cases some default settings may be made by executing specialized BIOS code, and a Master thread may be called for further setup duties, and so on.

After startup a Master thread need not typically remain executing in a stream of the processor. The Master stream, having accomplished its ends, may set another thread to start in the stream it occupies, then retire, or may simply retire, leaving an inactive stream available for use by another active stream to execute such as an interrupt service routine, a utility function of another sort, and the like. A Master thread may be recalled after retiring for a number of reasons. For example, a contention for resources may require the Master for resolution, or an interrupt or exception may require the Master stream for resolution. It will also be apparent to the skilled artisan that the Master stream in some systems may be running the Operating System or a portion thereof, or a routine loaded and active with a system BIOS, and the like. In some systems according to embodiments of the invention, all inter-stream control functions may be disabled, allowing the processor to run just as a processor without the control capabilities taught herein.

In some embodiments there may be certain fixed functionality. For example, a processor according to the invention may be hard-wired to make one stream always the Master stream, and no other. By hard-wired is meant that certain functionality is preset by the hardware resources implemented in silicon devices and their connections. Specific assignments of other threads to specific streams may also be set. In such cases, specific resource priorities and/or assignments may also be set, or any other of the inter-stream functionalities taught herein. Such pre-setting will be highly desirable for highly dedicated system applications, such as, for example, network routers and the like.

It will be apparent to the skilled artisan, following the teaching herein, that there will be a number of ways that control data may be represented, stored, and accessed. The illustrations provided herein are exemplary. In a preferred embodiment the control data map is implemented in silicon devices directly on the processor chip. This arrangement is preferred because, among other things, access to the control data is fast. In some embodiments, however, a control bitmap may be in any accessible memory device in a system, such as in an otherwise unused portion of RAM, or even on such as a flash card memory.

The concept and existence of a Master thread in a system according to an embodiment of the present invention has been discussed above. All other threads are slaves to a Master thread, so all active streams other than one Master stream are slave streams to the Master. There are, however, other levels of control other than Master and slave. Specific streams may be granted supervisory control, and be expected to exercise supervision responsibilities over other streams, as may be inferred from the teaching above. The state of supervisory bits in the embodiments of the present invention described above reflects the granularity of supervisory control.

It was described above that a Master thread may pursue such ends as initial setup and loading of threads into streams, and may return to resolve conflicts and exceptions. Just as in any other processor system, however, the overall system function is to execute one or more applications. In a general-purpose computer there may be many applications, and the uses of the computer are similarly many. One may browse the Internet, send and receive e-mails, make drawings, process photographs, compose word documents, and much more. Typically each application is dedicated to particular functions, and application threads, as applications are called, occupy one or more of the streams of the processor.

In more dedicated systems, such as, for example, a data router in a packet data network, there are relatively fewer applications, and the functions of the machine are typically ordered in some fashion other than user-initiated. In a data router, for example, the functions may be called according to characteristics of data received to be processed and forwarded.

In one aspect of the invention software is specifically enhanced to take maximum advantage of the new and unique control functions of a multi-streaming processor according to embodiments of the invention, although this is not required in all embodiments. Also, some software executing on a processor may be enhanced according to embodiments of this invention, and other software may not. Typically, there will be at least an operating system or Master thread, or both, with specific code to cooperate with the new control and status functions built into a multi-streaming processor according to embodiments of the invention.

Given the control data resources and functions described above with reference to FIGS. 1A through 1E, there are a wide variety of configurations that might be implemented, all the way from completely fair, with all streams being equal, to highly dedicated, with many functions preset and not variable. For example, in some processors according to the present invention one stream, say stream 0, may be always the Master stream by design. Since the Master stream has complete access to all processor resources, and may manipulate control data for all the other streams, while no other stream may change control functions for the Master stream, the data bits and values shown for streams in FIGS. 1B through 1E, and described above, would not need to be implemented for the dedicated Master stream.

Given the descriptions and exemplary architecture described above, there are a broad variety of inter-stream communications and control functions that may now be performed that were not available prior to the present invention. For example, any one active stream may manipulate its own resource allocation and priority according to its needs, which will relate closely to the nature of the thread running in the stream, and the nature of other threads available to run or actually running in other streams. Also an active stream may start, enable, disable, interrupt, branch and join other streams with prior knowledge of possible repercussions, because each active stream may check the control data settings for other streams. The enormous advantage provided is an ability to maximize real-time efficiency rather than simply use of processor resources. That is, system goals may now be addressed. Processors have historically been designed to maximize processor resources, in an often incorrect assumption that to do so necessarily addresses system goals as well. It is easy to understand, however, that a multi-streaming processor may be fully engaged efficiently accomplishing low-priority tasks, while higher priority tasks receive inadequate attention, and therefore does not adequately address system goals.

In embodiments of the present invention one active stream, running a thread (application) that may need or be enhanced by another thread running in parallel, may call the subservient thread and start it an available stream. An example is a WEB browser accessing a WEB page having an MPEG video clip. The browser, running in one stream of a processor according to an embodiment of the present invention may call an MPEG player to run in an available stream. The state of the data control bits and values will guide the browser stream in selecting a stream for the MPEG player. The browser may not, for example, co-opt an active stream running a thread having a higher priority. It may, however, co-opt a stream that has set its control data bits that it may at any time be interrupted.

Operation in this embodiment can be illustrated by following a sequence of operations to accomplish a typical task, such as forking a new thread. Threads can fork other threads to run in different streams. For example an operating system may wish to fork an application program, or an application may need to fork a sub-task or thread. A thread encountering an exception may fork a process to handle it.

Figure 2A:
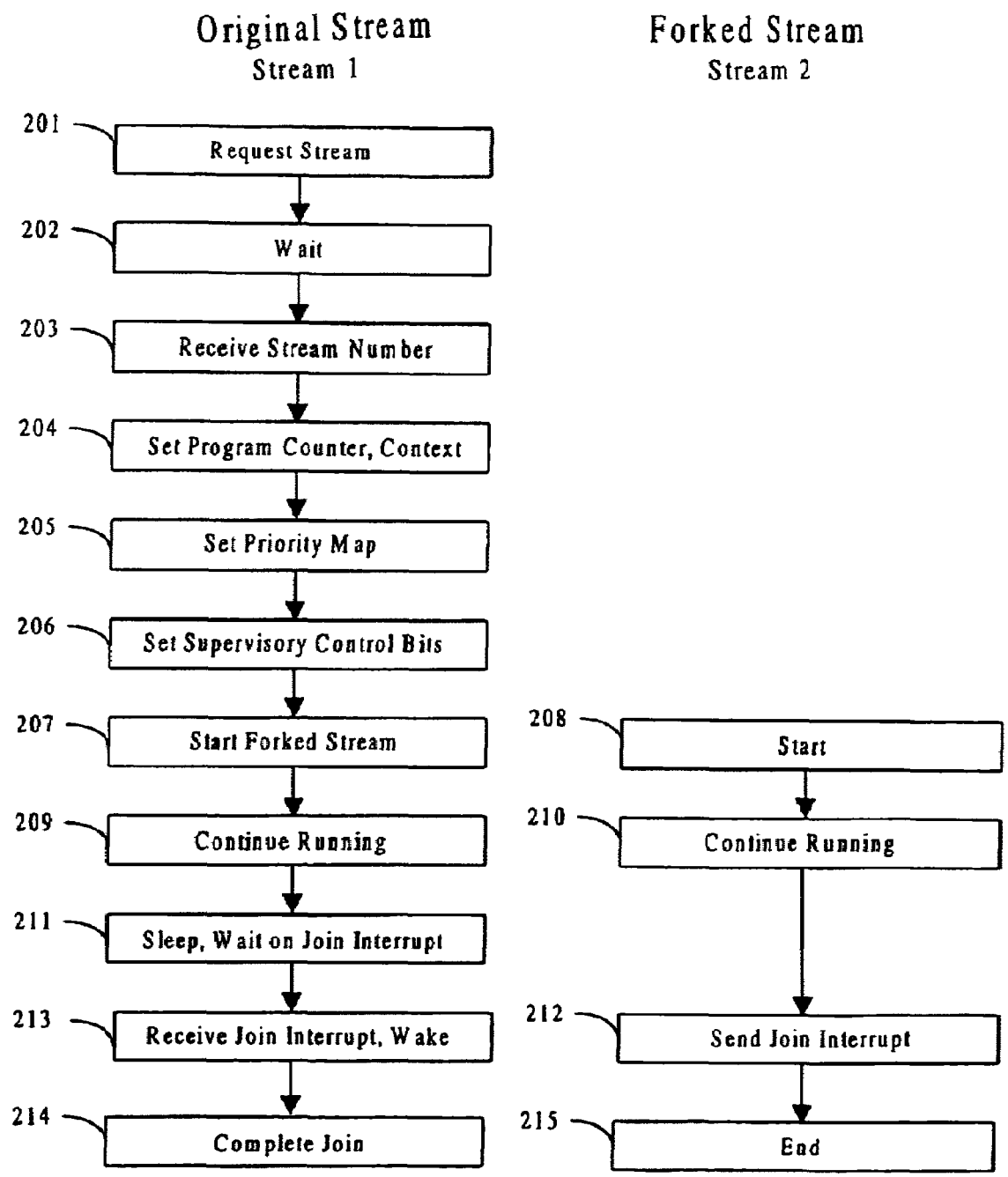
FIG. 2A is a flow chart illustrating one method whereby a thread in one stream forks a thread in another stream and later joins it.

A preferred method in an embodiment of the invention for fork and join operations is shown in FIG. 2A. Assume that the thread in stream 1 of FIG. 1A is forking a new thread. To do so, stream 1 as the supervisor thread requests an idle stream to use in step 201 and waits until such a stream is available in step 202. In most cases there will be no wait. Stream 1 receives the number of an available stream, for example stream 2 in step 203. In some circumstances there will need be a wait limit, after which, with no stream becoming available, alternate action is taken. For the present example, however, it is assumed that a stream is immediately available or becomes available in a reasonable interval.

To initialize stream 2 to run the new thread, active stream 1 loads the assigned stream's program counter with the address of the first instruction in the new thread and loads other components of the new thread's context into appropriate elements of processor resources in step 204 and sets the priority map for stream 2 in step 205. Stream 1 may also set supervisory control bits 107 for stream 2 in step 206. (Alternatively, the new thread, running in stream 2, may set the bits after step 208.) Stream 2 must have its supervisory control bits set to allow the supervisor thread to act as its supervisor and the supervisory control bits of the supervisor must be set to allow the controlled thread to interrupt it. When these initializing steps are done, the supervising thread starts the new thread in stream 2 in step 207. Alternatively, stream 2 may be put in sleep mode, waiting on an internal or external event. The new thread starts running in stream 2 in step 208. In steps 209 and 210 both streams run independently and concurrently until a join is required. In this example, it is assumed that the thread running in stream 1 finishes first.

When the supervisor thread needs to join the forked thread, it checks first to see if the forked thread is still running. If so, it executes an instruction at step 211 that puts itself to sleep, setting the sleep bit in stream control bits 118, and then waits for a join software interrupt from the forked thread. The forked thread sends a join interrupt in step 212 and the supervisor thread receives the interrupt and wakes in step 213. The supervisor completes the join operation in step 214. Finally the forked thread ends in step 215, freeing its stream for use by another thread.

Figure 2B:
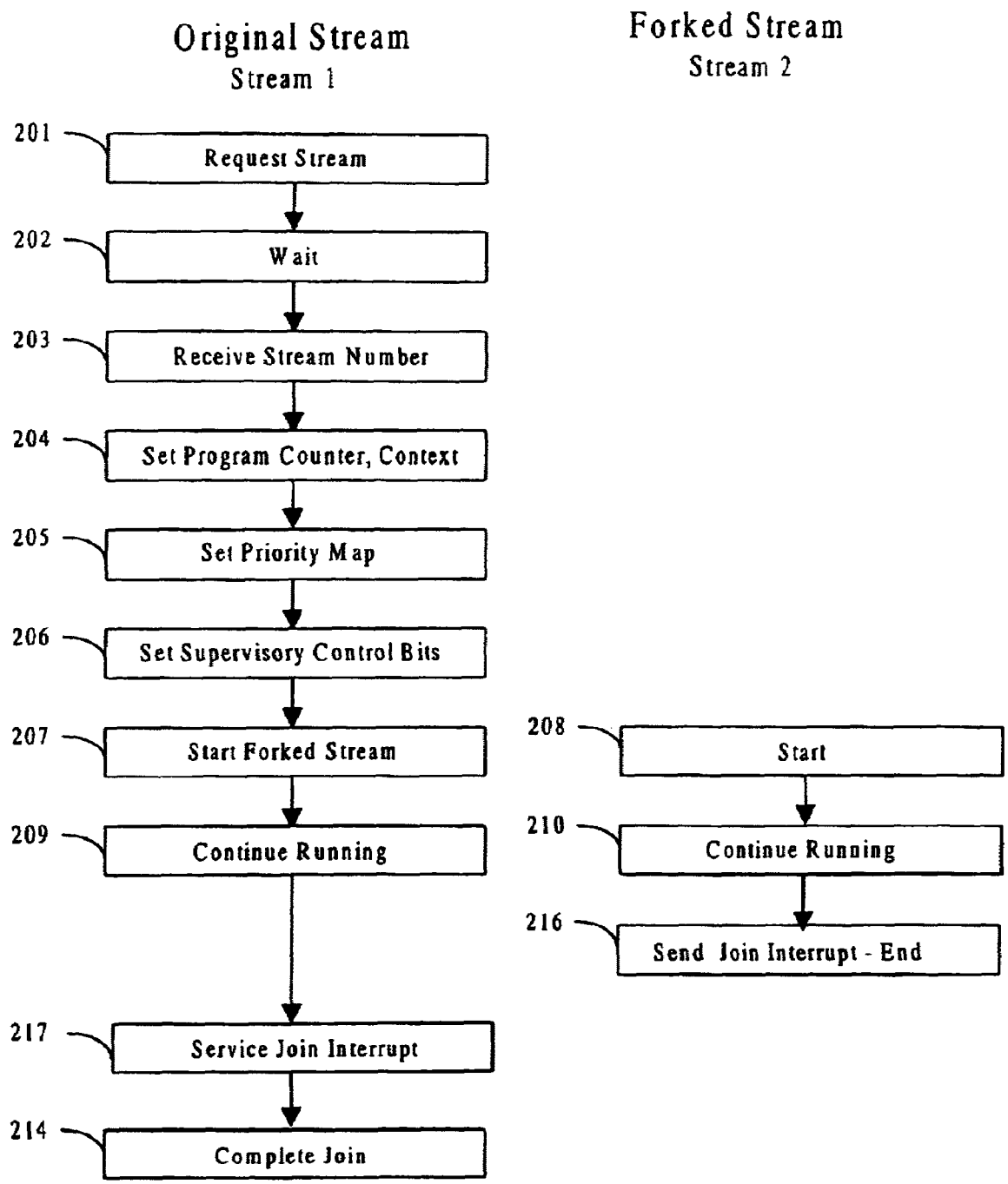
FIG. 2B is a flow chart illustrating another method whereby a thread in one stream forks a thread in another stream and later joins it.

FIG. 2B illustrates the companion case wherein the forked stream finishes before the supervisor stream. In this case, when the forked stream finishes, it immediately sends the join interrupt (step 216). The interrupt remains on hold until the supervisor stream finishes, then the interrupt is serviced in step 217 and the join is completed. If registers can be loaded and stored in the background as described in co-pending priority application filed Jan. 27, 1999, entitled "Register Transfer Unit for Electronic Processor," now U.S. Pat. No. 6,297,888, then the process of forking a new thread for which the context is not already loaded is modified from the steps shown in FIG. 2 as shown in FIG. 3.

Figure 3:
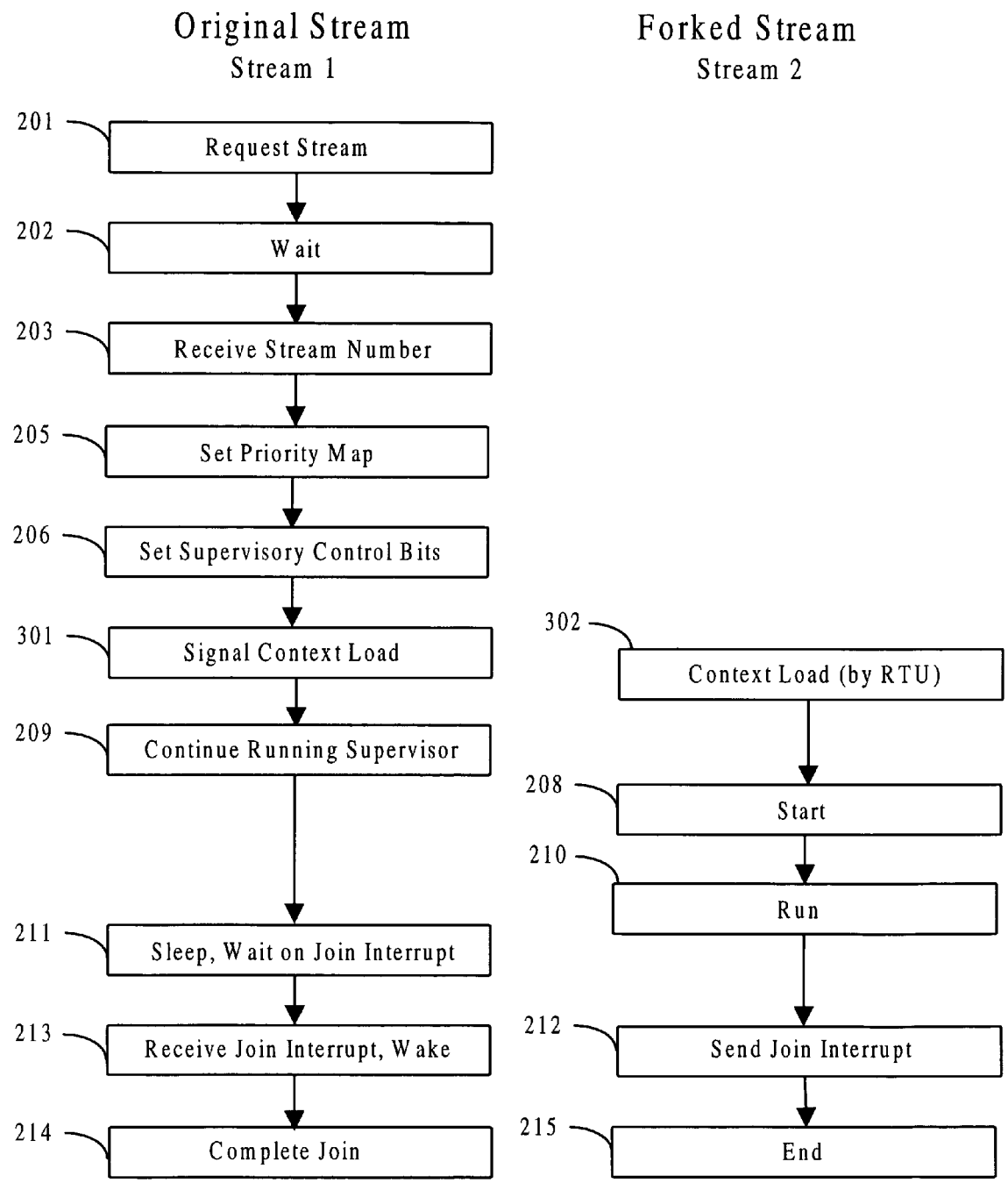
FIG. 3 is a flow chart illustrating a method whereby a stream in one stream forks a thread in another stream in a processor containing a special register transfer.

As shown in FIG. 3, the steps are identical to those in FIGS. 2A and 2B, except step 204 for setting program counter and context is eliminated. After step 206, in new step 301, the supervisor signals the register transfer unit (RTU) to load the context for the new stream. When these operations are complete, the supervisor can continue with other operations in step 209.

The RTU does the context switch in step 302. When the RTU is done loading the new stream's context, it can make the freshly loaded register file active and start the new stream in step 208, again, independently of the supervisor stream. Step 207 of FIG. 2 is thus eliminated. The remaining steps are identical to FIG. 2A, assuming the supervisor finishes first. Otherwise the same as FIG. 2B. As in FIG. 2 of the co-pending application, the register file previously used by stream 2 will be saved.

The embodiments described above are exemplary of many embodiments that may be implemented within the scope of the present invention. Those skilled in the art will recognize that the powerful architectural concepts taught for the first time herein may be applied to many types of processors, including but not limited to single-chip systems, microprocessors, controllers, routers, digital signal processors (DSPs), routing switches and other network devices, and processors designed for other special uses. The teachings of this invention may be practiced in conjunction with processors of any size, from simple one-chip complete systems to complex supercomputer processors. The invention may be realized in simple and highly dedicated form for small systems or in complex, sophisticated form for large systems. By defining and enabling master and supervisor streams to control the utilization of resources of slave streams, a processor can be dynamically configured to meet the requirements of particular software and software mixes, to meet strict timing requirements for example. Streams can, for example, be guaranteed a certain percentage of overall processor throughput, or a percentage utilization of particular resources or classes of resources. Thus the new architecture allows balancing the optimization of the execution of particular threads along with efficient use of processing resources.

As a further example of the use of priorities, consider a router for use in a packet-data network embodying a processor according to FIG. 1A. Each stream in the router processor, except for a control program running as the master in stream 0, processes a separate flow of packets of three different types. Each of the three slave streams are processing packets using different protocols that have different service guarantees related to the timely forwarding of packets. Assume that for the particular protocols and classes of service being processed, access to integer units will have a great impact on meeting service guarantees. Accordingly, the master sets the priority map of stream 1, which has the highest service guarantee, to the value 6, giving it priority access to integer units higher than the other streams (except the master). Stream 3, with the next most strict service guarantee, has a lower priority, 5, and stream 2 the lowest priority, 3. After initially setting priorities, the Master monitors throughput for each protocol and insures that service guarantees are being met, modifying priorities further as needed. Thus the supervisor can dynamically allocate resources to streams based on the current needs of the threads, modifying priorities as needed to meet service guarantees of a wide variety of protocols and classes of service. Because service guarantees are met using supervisory software and not hardware, the router can be easily upgraded as new requirements evolve.

Another example of the use of priorities may also be illustrated by a data router system. Consider such a system having four streams, wherein one or more threads are available to streams for processing data packets. Assume that contexts have been loaded to register files and associated with streams to start a thread in each of the four streams to process arriving data packets.

As is known in the art of data routers not all data packets need equal processing. Some packets need only be forwarded as received. Others may need to be restructured into a different format. Still others will need to be, for example encrypted/decrypted. The type of packet dictating the work flow to process the packet is typically contained in a header for the packet, and the type and scope for processing can only be known to the processor after a thread context is loaded to a register file, the register file is associated with a stream (active stream) and processing is commenced on a data packet.

In a preferred embodiment of the present invention, as was illustrated in FIG. 1D and described above, each stream is said to have an execution priority, meaning that only a process with higher priority may run in that stream. In one aspect the execution priority for each stream of a processor is maintained as three editable bits in a portion of bit map 115 of FIG. 1A. In the exemplary data router case, as packets arrive to be processed, the context for the packet is loaded to a register file. This may be done in preferred embodiments by a Register Transfer Unit (RTU) according to the teachings of priority document Ser. No. 09/240,012, now U.S. Pat. No. 6,292,888.

As described immediately above, it is necessary to commence processing of a data packet before the nature of the packet may be known. Therefore, as packets arrive and register files are loaded, each context is given an initial high priority. For example, on a scale of seven, each initial context will be assigned a priority of six.

Now, as streams become available, register files are associated with streams, according to priority of the register files and the execution priority of the streams. Associating a register file with a stream starts the context thread in the stream, constituting an active stream. The stream's execution priority is now set to the high priority (in this example, six) of the context that was loaded. As processing of the newly-loaded packet begins, it may be determined that the packet is indeed a fast packet, and the high priority is indeed appropriate, in which case the processing will continue to completion. In the present invention, at the completion of processing of a packet it is desired that the next context started in the stream be the highest-priority-level waiting context. This is done in this example by selectively lowering the execution priority until a context loads, or the execution priority is zero. The only way zero will be reached is if there is no waiting context of any priority. In this situation the stream will remain idle until any context becomes available.

In this example, if the execution priority is six at the end of processing a packet, the execution level is reset to five, then four, and so on, which assures that the next context loaded will be the waiting context with the highest priority level.

As processing commences, however, it may be determined that the packet is of a type that deserves an intermediate priority. The thread running in the stream then lowers the execution priority to perhaps four. If there are no waiting contexts higher than priority four, the active stream continues to process the data packet to completion, and follows the example described above, wherein, upon completion the stream will set its execution priority to three, then two, and so on until a new context loads. If, however, a new packet has arrived, since new contexts are given an initial priority of six, the arrival of the new packet will force a context switch, causing the stream to cease operations on the slower packet, and to commence processing instead the new, higher-priority data packet, resetting the execution priority of the stream to six.

If the context switch ensues, the saved context still has a priority of four, and will await opportunity for re-assignment to a stream for further processing, typically under control of the RTU, as described above. There is, of course, no guarantee that any newly arrived data packet is a faster packet, but there is a certain probability that this is so. If the new packet is a faster packet, then system goals are enhanced. If not, then the active stream, now at priority level six again may again lower its own execution priority to potentially delay execution of the newly loaded packet, and seek again a faster packet to process. The new packet, for example, may be a very slow packet, requiring decryption. The active stream may then lower the execution priority to two, and again force a context switch if a new packet has arrived for processing, in which case a context will be saved with a two priority for the slow packet, which will than wait for processing opportunity by virtue of priority. If a stream is running at an execution priority of two, no new packet (six) arrives, but there is a waiting context with a four priority, the four context will pre-empt the stream with the two execution priority, and so on.

In this manner, packets may be processed with priority according to type, even though the type cannot be known until the context is loaded and processing has commenced on each newly-arriving data packet, providing a new way for system goals to be met in data routing applications, while also ensuring processor efficiency.

Many other useful functions are consistent with the invention's teachings regarding interstream control and communication. In a simple two-stream controller for a dedicated application, for example, with a fixed master/supervisor and a fixed slave stream, a single supervisory control bit for the slave stream could give the master stream a useful type of resource control, such as allowing access to a floating point unit, while allowing the slave to suspend such control during critical periods using the supervisory control bit.

The types of control that one stream may have over other streams through the mechanisms of supervisory control bits and stream control bits are not limited. A single type of control or a large number of controls may be appropriate, depending on the purpose of the system. Additional controls could regulate the sharing of global registers or global memory, memory protection, interrupt priorities, access to interrupt masks or access to a map between interrupts or exceptions and streams, for example. In a processor with one or more low power modes, access to power control may also be regulated through additional supervisory control bits and stream control bits or such control may be reserved exclusively for a stream that is running the master thread.

The type of control that one stream may have over another stream's resources can also take many forms. In one of the simplest forms, a simple two-stream controller, for example, to be used in a dedicated application, with a fixed master/supervisor and a fixed slave stream, a single stream control bit for the slave stream could give the master stream the ability to disable the slave during instruction sequences when the master needs fill use of all resources.

Priorities and scheduling of any form described in priority document Ser. No. 09/216,017, now U.S. Pat. No. 6,477, 562, may be implemented in combination with the new teachings of the present invention. If such priorities are not implemented, then a stream could exert a simpler form of control by directly blocking another stream's access to one or more resources temporarily. In this case the supervisory control bits representing priorities would be replaced with bits representing resource control. Priority maps would be replaced with one or more control bits used to temporarily deny access to one or more resources or classes or resource. For example, if one stream needs exclusive use of a floating point unit, it can be made a supervisor of the other streams, and set resource control bits denying access to the floating point unit in each of the other streams while it needs exclusive access. If another partially blocked stream encountered a floating point instruction, the instruction scheduler would suspend execution of the instruction until the floating point resource control bit for that stream were reset by a supervisor stream.

Interrupts and Exception Handling in Multi-Streaming Processors

The area of interrupts and exceptions has been but briefly described in the aggregate disclosure above. It will be appreciated by the skilled artisan, however, that the existence of multiple streams, with all of the many new degrees of freedom and versatility introduced thereby, creates a considerable complexity where interrupts and exceptions are concerned. The inventors have determined that there is a significantly neglected field in the architecture for all types of multi-streaming processors, including but not limited to the types described above: the flexible and orderly handling of interrupts by individual streams, as a general method for accommodating devices external to the processor, exceptions, and inter-stream communications. Accordingly the present inventors have further provided unique and powerful apparatus and methods for extending functionality through interrupt and exception coordination and mapping. These new techniques are presented below in enabling detail.

In embodiments of the present invention related to interrupts and exceptions the inventors recognize several types:

External—the interrupt is generated by a device external to the processor, such as a printer interface, modem or other I/O device.

Internal—special instructions are executed by the processor that intentionally generate interrupts for purposes such as quickly calling a section of code or communicating between threads. Such interrupts are also known as software interrupts.

Exception—a special "exceptional" event occurs during processing, caused by execution of an instruction or a hardware error. For example, an instruction may attempt to divide a number by zero, a return stack may overflow or an attempt to fetch from memory may generate a memory parity error.

In the realm of software interrupts, in the context of multi-stream processors, in embodiments of the present invention a thread executing in one stream can interrupt another stream. In descriptions herein it will be said that one (active) stream interrupts another stream, which may or may not be active. This mechanism is used in embodiments of the invention to initiate processing of special events or at specific places in a code sequence. In some instances an active stream can use this inter-stream interrupt capability to gain control of the processor, pre-empting and stopping execution of threads in other streams. In another example, an inter-stream interrupt may be used by one stream to request some task be done by another stream to improve performance or response.

As an example of an internal, stream-to-stream interrupt, one can imagine an application program (thread) running in one stream, wherein the application has repeated and frequent need for executing another thread or task. Typically such a process in the prior art would be accomplished by calling the task, performing a context switch, processing the task, then performing another context switch to return to the original thread. In embodiments of the present invention, having dedicated registers for each stream, the main application can be mapped to one stream and the other task to another, with the first stream interrupting the second when the task is needed, avoiding considerable processor overhead.

The skilled artisan will understand that this is but one of many examples of inter-stream interrupts. The methods and hardware constructs needed to accomplish such mapping and inter-stream activity is described in more detail below.

In an extension of the mechanism of inter-stream interrupts, in embodiments of the present invention an active stream may pass off exception processing to another stream. In this process the stream encountering an exception interrupts the stream mapped for exception processing, and waits until the exception-processing stream finishes before continuing with its own processing. This unique capability is especially important for real-time systems so the overhead of changing contexts may be avoided. Structured exception handling could then also be implemented in hardware.

External Interrupts

Figure 4:
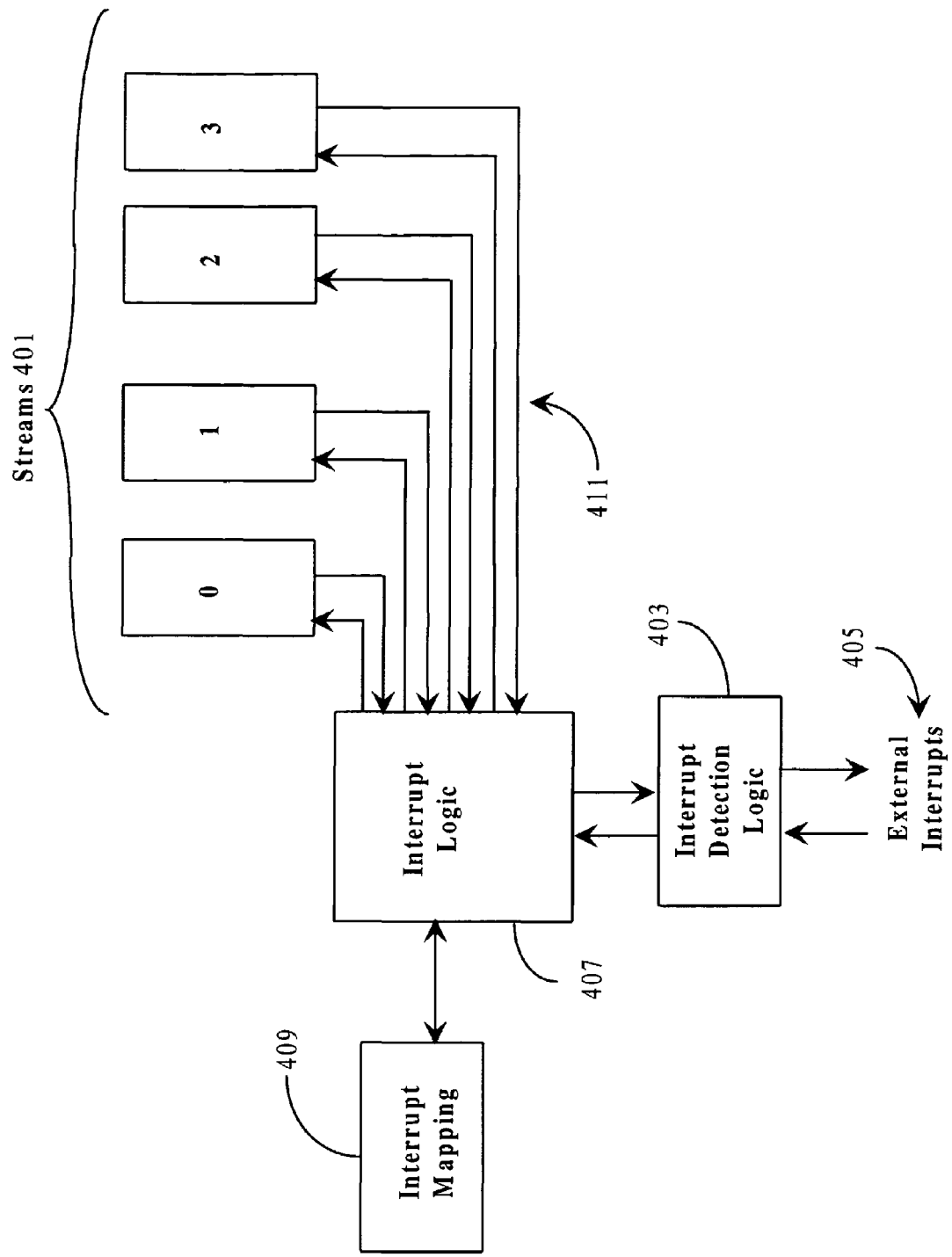
FIG. 4 is an architecture diagram illustrating interrupt mapping and processing in an embodiment of the present invention.

FIG. 4 is an architecture diagram illustrating general interrupt mapping and processing in an embodiment of the present invention. In this diagram streams 401 labeled 0, 1, 2 and 3, are the same four streams as streams 103 in FIG. 1A. For external interrupts the processor includes interrupt detection logic 403 for detecting external interrupts 405 generated by devices external to the processor. The interrupt detection logic communicates with interrupt logic 407. Logic 407 in some embodiments communicates with interrupt mapping data 409, which may in some embodiments be a part of control map 115 of FIG. 1A, but may also in some embodiments be a separate entity on or off the processor. The interrupt logic interrupts individual streams, and individual streams respond (acknowledge) by logic paths 411.

For an external interrupt, as described briefly above, the interrupt (405) is generated by a source external to the processor, and is detected in a multi-stream processor according to embodiments of the present invention by Interrupt Detection Logic 403. This detection can be done in any of several ways. The external devices may, for example, exert each a dedicated interrupt line having an input pin to the processor, and the detection can be on leading or trailing edge of a voltage change, for example. Other means of interrupt issuance are known to the inventors.

Once an external interrupt is detected, logic 403 communicates the receipt of the interrupt to Logic 407. It is the task of Logic 407 in this embodiment to process the interrupt according to one of several possible mechanisms, new in the art for multi-streaming processors. Specifically, Interrupt Logic 407 receives the interrupt and decides which stream or streams to interrupt depending on the type of interrupt and on one or any combination of the following mechanisms:

Static mapping—Interrupts are mapped to specific streams and this mapping is fixed and unchangeable. Example—three types of interrupts and two streams. Type one interrupt is mapped to stream two and type two interrupt is mapped to stream one, with type three interrupts mapped to both stream one and two. In a preferred embodiment static mapping of this sort is accomplished by specific logic devices in logic 407 (hard-wired), and is fixed at design time.

Programmable mapping—Interrupts are mapped to specific streams by programming bit-maps or data storage. In this variation there may be a an Interrupt Map 409, and Interrupt Logic 407 refers to this map for each interrupt received to determine which stream or streams to interrupt. This mapping is generally done at boot-up time or by the operating system, and is fixed prior to the interrupt occurring. Once an interrupt is detected, this mapping is consulted and appropriate streams are interrupted. Example: assume three types of interrupts and two streams. Type one interrupt may be mapped to stream two and type two to stream one, with type three mapped to both stream one and two. At a later point in time, when the streams are running different threads, types one and two are both mapped to stream one and type three is mapped to both streams one and two. The map (409) in this case will have been altered by software such as the operating system to change the mapping.

Dynamic or conditional mapping—In this case interrupts are mapped to specific streams by using logic which is made aware of the state of the machine at the point in time the interrupt occurs and creates the mapping based on that fact and also on any other parameter, for example the type of interrupt. Mapping is created dynamically every time an interrupt occurs. For dynamic mapping there may be an algorithm to process (firmware or software routine), or logic may have bits and registers settable to alter the result of an interrupt communicated to Logic 407. Example—The interrupt-mapping algorithm could map interrupts to the stream that is inactive or if no inactive stream exists to the stream running the lowest priority thread.

Once Logic 407 determines the mapping, streams are interrupted on logical paths 411. The skilled artisan will recognize there are several ways the interrupt may be issued to a stream once the determination is made. Once an interrupt is issued to a stream or streams, the streams have to acknowledge that they are ready to execute an interrupt service routine. (Vectoring to an interrupt service routine is a process well-known in the art to those with ordinary skill. This acknowledgement can occur at different times for different streams. Any delay may be due to code currently executing on the stream, or the stream may temporarily mask the interrupt. The interrupt, however, will remain pending as long as the external source exerts the interrupt. Interrupt detection logic 403 will control this behavior. If multiple streams are required to acknowledge the interrupt, the interrupt logic will wait till all of them have acknowledged before sending an external acknowledgement. This behavior can be modified as necessary, i.e. the external acknowledgement can happen after only one stream has recognized the interrupt or in any other combination.

As each stream acknowledges an interrupt, the interrupt logic sends the appropriate service vector to the stream. This vector may be the same or different for each of the streams. Depending upon the vector that the stream receives, the associated interrupt service routine will be loaded into the stream to begin executing. Hence different streams could have different responses or behavior for the same interrupt. Example—an audio device may interrupt two streams, one of which vectors to the interrupt service routine to store the audio data to a hard disk drive. The other stream may vector to an audio playback routine, and direct the audio data directly to speakers.

After each stream that is interrupted finishes its interrupt service routine it will normally return back to whatever thread it was running before the interrupt occurred. Again different streams can take different amounts of time to go back.

Internal Interrupts

Internal interrupts, as briefly described above, are generally software interrupts that are used by programs to request specific functionality from the operating system or to execute sub-routines. These interrupts in embodiments of the present invention are managed to behave with the degrees of functionality described above for external interrupts. Software interrupts issued by active streams are processed by logic 407, and the interrupt logic can handle these interrupts and map them according to the three types as described above. Another variation on the mapping is the special case wherein an interrupt is only mapped to the stream executing the soft-interrupt. The rest of the steps will be as above.

Synchronized Interrupts

Synchronized interrupts are variations on the above cases, i.e. both internal and external interrupts. Synchronized interrupts behave differently in the vectoring stage. In the case of synchronized interrupts the interrupt logic will not vector the streams to execute interrupt service routines until it has received acknowledgements from all the streams to which the interrupt is mapped. This behavior is to require a synchronized start of response to an interrupt. For example, consider a debugging interrupt, i.e. a breakpoint set on a thread executing on one of the streams. The debugger may want to view the state of the system at a stable point, i.e. at the point where all the streams have stopped executing whatever thread they were executing. Hence the interrupt logic will generate the interrupt to all of the streams, but will wait till they all have generated acknowledgements before vectoring them to the debugger service routine. However, even though the logic waits for all the streams to catch up, the streams that acknowledge are stopped from further execution.

Exceptions

Exceptions are generated by code running in the streams and generally indicate error conditions. Exceptions are always synchronous to executing code, i.e. the stream generating the exception will always do so at the same point. There may, however, be many different responses to exceptions.

Self-response. This is the same as in a standard non multi-streaming processor. Here the stream generating the exception stops whatever it is doing and vectors to the exception handling routine and starts executing code from there. When the exception handler routine finishes, it will normally return to the point in the original code where the exception took place and the original thread will continue execution.

Blocking send to another stream—Here the stream generating the exception will stop execution of the current thread, but will not acknowledge the exception itself. The exception instead is broadcast to all other streams. Whichever stream is programmed or mapped to acknowledge the exception will do so and start execution of the exception handler routine. If no stream acknowledges the exception, then the Master thread will be sent the exception. If the master thread is already executing, it will now vector to the exception handler. If it is not running, it will be made active and allocated to a stream for execution, and then it will handle the exception. The Master thread is always capable of acknowledging any exception, if no other thread will. This way structured exception handling can be implemented in hardware. Once the exception routine returns, the original stream is notified and can then start its execution again. This method is implemented mainly for the reason that all streams may not have access to all the hardware resources needed to process a certain exception, and hence the stream that is incapable has to pass the exception to one that is capable.

Non-blocking send to another stream—This method is similar to the one above, but the original stream that generates the exception is not blocked. It generates the exception and then continues executing. Exception handling is guaranteed to complete by another stream or the master thread. This method is generally used for non-fatal exceptions like overflow. As and example consider the overflow exception—the stream generating the overflow sets a flag to indicate that it generated the exception and continues to execute. Another stream can acknowledge the exception and update a counter to count the number of times a particular value overflowed.

Any exception can be mapped to any of the above three categories. This mapping can again be done using the same techniques as for the interrupts. Exceptions can also be synchronized, in that an exception handler may not be executed until all the streams that that exception is mapped to have stopped executing and acknowledge the exception.

Implementation of the mechanisms described above, involving software and hardware interrupts and exception handling relative to multi-stream processors, may in some instances (programmable mapping) be accomplished partly through an alterable control file. Referring to FIG. 1A, an inter-stream control bitmap 115 was described wherein state of single bits and bit values of multiple bits are associated with specific streams and functions, such as enabling, disabling and priorities. In some embodiments of interrupt and exception mapping and handling this bitmap is extended to the functions described herein relative to interrupt and exception handling and mapping. As previously described, bitmap 115 may be implemented on the multi-stream processor chip as hardware in a manner that the bit values may be altered by active streams. In other embodiments a file in local memory may be used for mapping interrupts and interrupt and exception parameters. In embodiments using portions of such a bit map for mapping, single bits or bit values for multiple bits may be used to map streams to interrupts and exceptions much as enabling, disabling, priorities and the like are mapped in description above relative to FIGS. 1B through 1E.

It will be apparent to the skilled artisan that there are many alterations that may be made in the embodiments described above within the spirit and scope of the present invention. For example, there are many ways the supervisory characteristics and relationships between streams may be recorded and amended, beyond the examples provided. There is similarly a broad range in granularity in control that may be exercised, and so on. Accordingly, the invention is limited only by the breadth of the claims below.

What is claimed is:

1. A multi-streaming processor comprising:
    a plurality of hardware streams for streaming one or more instruction threads;
    a set of functional resources coupled to said hardware streams for processing instructions from said streams;
    interstream control coupled to said functional resources including a master mode wherein more than one stream is accorded master status, and the streams accorded master status may each run a master thread exercising master control over other streams not under control of another master stream;
    interrupt detection logic, coupled to interrupt signals, for providing said interrupt signals to the processor;
    interrupt mapping logic, for providing configurable interrupt mapping of said interrupt signals to ones of said plurality of streams such that at least one of said interrupt signals is mapped to ones of said plurality of streams; and
    interrupt logic, coupled to said interrupt mapping logic, for interrupting one or more of said streams according to said configurable interrupt mapping provided by said interrupt mapping logic;
    wherein through said interrupt logic, said interrupts are detected, and at the time of their detection said ones of said plurality of streams are directed to process said interrupts.

2. The processor of claim 1 wherein one of said plurality of interrupts may be mapped to two or more of said plurality of hardware streams.

3. The processor of claim 1 wherein said plurality of interrupts comprise:
    internally generated interrupts;
    externally generated interrupts; and
    exceptions.

4. The processor of claim 1 wherein said plurality of interrupts comprise:
    external interrupts generated by a device external to the processor;
    internal interrupts intentionally generated by special instructions executed by the processor; and
    exceptions caused by execution of an instruction or a hardware error.

5. The processor of claim 1 wherein mapping of said interrupt signals to ones of said plurality of streams is programmable.

6. The processor of claim 5 wherein said configurable interrupt mapping is programmed in a data store, and said interrupt logic references said data store for mapping said interrupt signals to ones of said plurality of streams.

7. The processor of claim 1 wherein said interrupt signals are software interrupts generated by said hardware streams.

8. The processor of claim 6 wherein said data store further comprises a mask for enabling and disabling execution of said interrupt signals.

9. The processor of claim 1 wherein, after said interrupt mapping is determined for a detected one of said interrupt signals, said one or more hardware streams are interrupted by said interrupt logic.

10. The processor of claim 9 wherein said one ore more hardware streams interrupted by said interrupt logic acknowledge said interrupt, and are vectored to a service routine by said interrupt logic.

11. The processor of claim 10 wherein two or more of said hardware streams are interrupted by one of said interrupt signals, and wherein said interrupt logic delays vectoring any of said hardware stream to said service routine until all interrupted said hardware streams acknowledge said interrupt signal.

12. The processor of claim 11 wherein two of said streams acknowledging said interrupt signal are vectored to different service routines by said interrupt logic.

13. A method for processing an interrupt in a multi-stream processor having a plurality of hardware streams, comprising:
    implementing interstream control in the processor wherein a stream may exert control functions on one or more of the plurality of hardware streams;
    establishing control access privileges associated with each of the plurality of hardware streams;
    exercising interstream control between the plurality of hardware streams, the interstream control utilizing said step of establishing control access privileges to assure compliance of controlled streams;
    detecting the interrupt and passing the detected interrupt to interrupt mapping logic;
    determining, using the interrupt mapping logic, which ones of the plurality of hardware streams are to be interrupted by the interrupt; and interrupting the ones of the plurality of hardware streams that are to be interrupted by the interrupt.

14. The method of claim 13 wherein the interrupt is mapped to two or more of the hardware streams.

15. The method of claim 13 further comprising:

mapping of the interrupt to one or more hardware streams statically at time of manufacture of the processor.

16. The method of claim 13 wherein mapping of the interrupt is programmable within the processor.

17. The method of claim 16 wherein the mapping is programmed in a data store, and the interrupt mapping logic refers to the data store for mapping the interrupt to the ones of the plurality of hardware streams.

18. The method of claim 13 wherein the interrupt is an external interrupt generated by a device external to the processor.

19. The method of claim 13 wherein the interrupt is a software interrupt generated by one of the plurality of hardware streams.

20. The method of claim 17 wherein the data store comprises a mask for enabling/disabling execution of the mapped interrupt.

21. The method of claim 13 further comprising:

vectoring the ones of the hardware streams to service routines after the hardware streams acknowledges the interrupt.

22. The method of claim 21 wherein the ones of the hardware streams are interrupted by the interrupt, and wherein interrupt logic delays vectoring any of the hardware streams to a service routine until all of the ones of the hardwarestreams that are mapped to the interrupt acknowledge the interrupt.

23. The method of claim 22 wherein the ones of the hardware streams acknowledging the interrupt are vectored to different service routines by the interrupt logic.

* * * * *